US005373639A

United States Patent [19]

Huang

[11] Patent Number: 5,373,639

[45] Date of Patent: Dec. 20, 1994

[54] PIPE CUTTER

[75] Inventor: Chi-Chieh Huang, Feng Yuan City,

[73] Assignee: Taiwan Silver Star Co., Ltd., Taichung Hsien,

[21] Appl. No.: 161,124

[22] Filed: Dec. 2, 1993

[51] Int. Cl.[5] .......... B23D 21/06

[52] U.S. Cl. .......... 30/92; 30/184; 30/242

[58] Field of Search .......... 30/92, 94, 120.5, 184, 30/242; 81/362, 363

[56] References Cited

U.S. PATENT DOCUMENTS

| | | | |
|---|---|---|---|
| 551,041 | 12/1895 | Mueller | 30/184 |
| 974,553 | 11/1910 | Cloes | 30/242 |
| 2,916,953 | 12/1959 | Demler | 81/362 X |
| 5,046,250 | 9/1991 | Huang | 30/92 |

*Primary Examiner*—Douglas D. Watts

*Attorney, Agent, or Firm*—Kolisch, Hartwell, Dickinson, McCormack & Heuser

[57] ABSTRACT

A pipe cutter includes a hollow head portion having a first and second ends and a passage way is formed along a longitudinal axis thereof. A jaw element is formed on the first end of the head portion thereby defining a mouth for receiving a pipe to be cut. A blade means has a blade received therein, the blade slidably engaged in the passage way of the head portion. Two handles, each has two ends, one end thereof pivoted to the head portion. A transmission means has first and second ends, the first end pivoted to the blade means and the second ends pivoted to the handles, such that the transmission means converts pivotal movements of the handles into linear movement of the blade means.

3 Claims, 4 Drawing Sheets

PIPE CUTTER

BACKGROUND OF THE INVENTION

The present invention relates to a pipe cutter, more particularly, to a pipe cutter including a hollow head portion, a blade means, a transmission means and two handles.

The prior arts of which applicant is aware are his prior U.S. Pat. No. 5,218,765 to Huang, filed Nov. 17, 1992, entitled "PIPE CUTTER" and U.S. Pat. No. 5,046,250 to Huang, filed Nov. 8, 1990, entitled "pipe cutting device". In both of these two patents, a complicated structure is required to assembly the cutter to cut a pipe.

The present invention has arisen to mitigate and/or obviate the afore-described disadvantages of the conventional cutter.

SUMMARY OF THE INVENTION

The present invention provides a pipe cutter which includes a hollow head portion having a jaw element, a blade means, a transmission means and two handles. The blade means is slidably engaged in the head portion, and the transmission means has first and second ends which are pivoted to the handles and the blade means respectively, such that the transmission means converts movements of the handles into linear movements of the blade means.

It is an object of the present invention to provide a cutter having a blade means moving in a direction perpendicular to that of the force exerted by hands to the handles, which is convenient for users to use like conventional pliers.

It is another object of the present invention to provide a pipe cutter with a concise structure.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
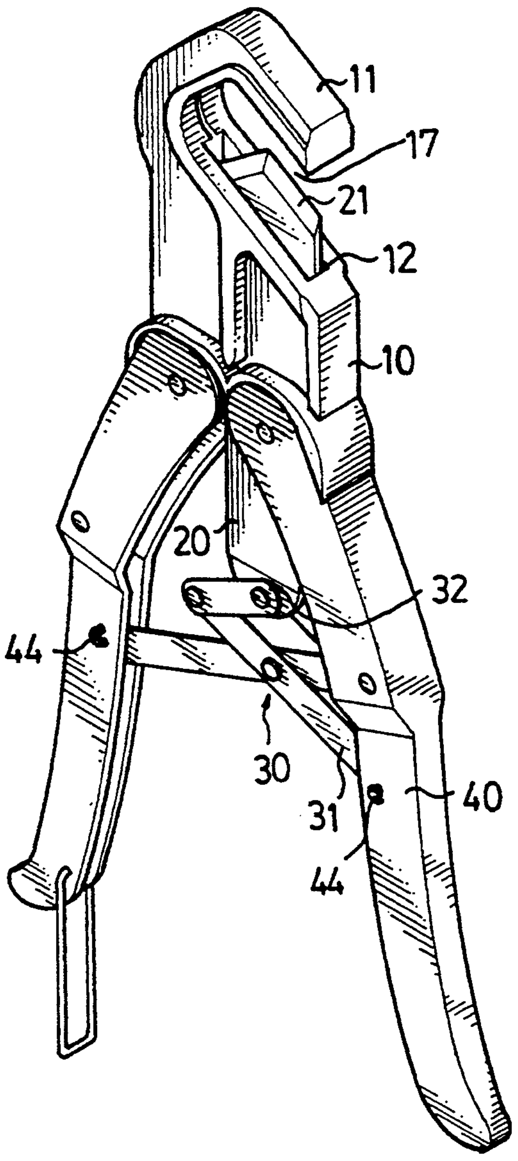
FIG. 1 is a perspective view of a pipe cutter in accordance with the present invention.
Figure 2:
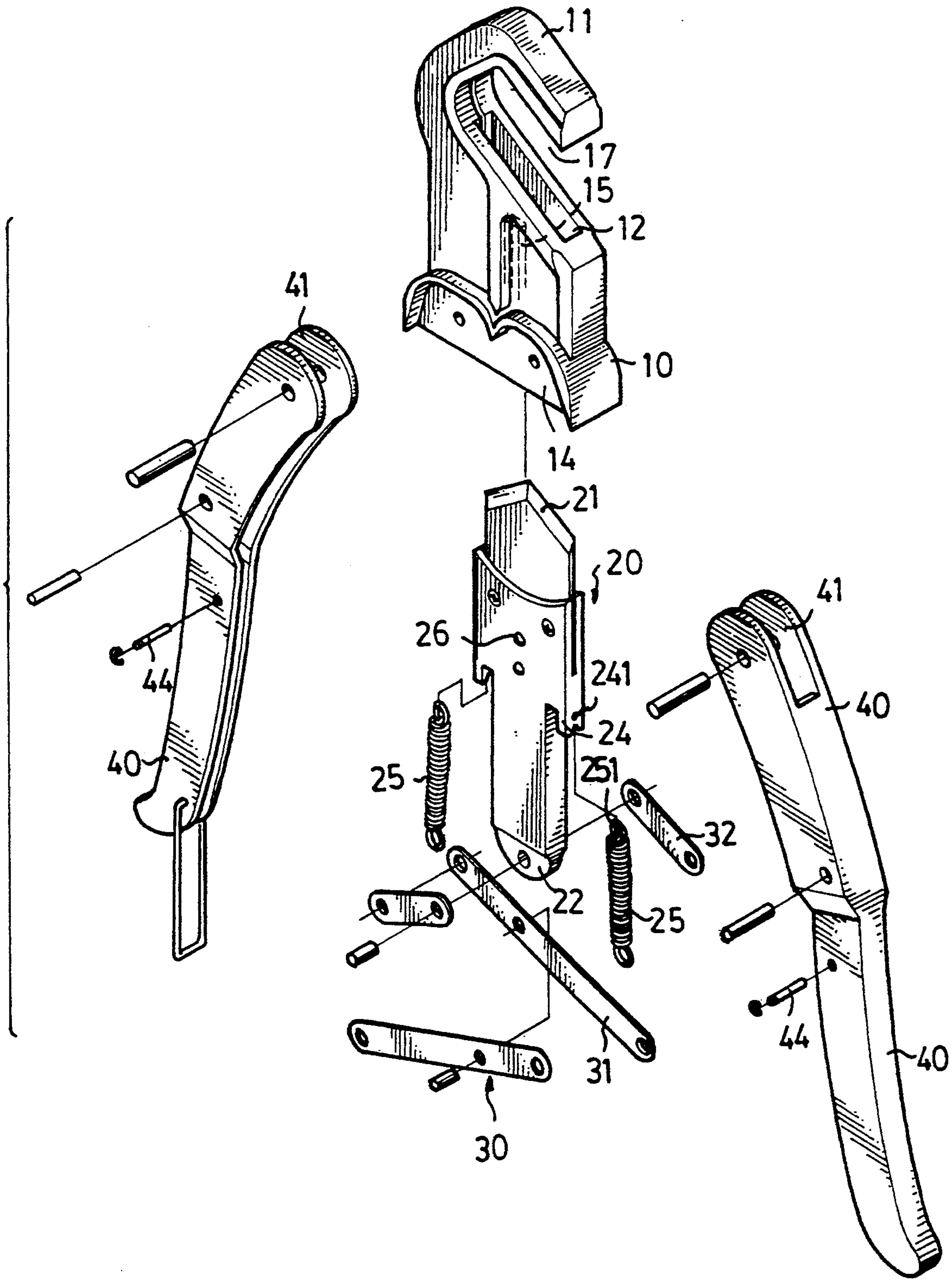
FIG. 2 is an exploded view of the pipe cutter in accordance with the present invention.

Referring to the drawings and initially to FIGS. 1 and 2, a pipe cutter in accordance with the present invention generally includes a hollow head portion 10 having a passage way 12 formed along a longitudinal axis thereof, a blade means 20 having a blade 21 received therein, a transmission means 30 and two handles 40. The head portion 10 has first and second ends, a curved jaw element 11 being formed on the first end of the head portion 10 thereby defining a mouth 17 for receiving a pipe to be cut, a slot 15 being formed in an inner surface of the passage way 12 and a connecting plate 14 being formed on the second end of the head portion 10.

The blade means 20 has first and second ends, a blade 21 being disposed in the first end thereof, an extending part 22 being formed on the second end thereof, two protrusions 24 being respectively formed on each side of the blade means 20, a recess 241 being formed in the protrusion 24 for connecting with one end of a spring 25 and a rolling element 26 being disposed in an outer surface of the blade means 20 for rotatably engaging in the slot 15 of the head portion 10.

Two handles 40, each has U shaped cross section and two ends, two lugs 41 being formed on one end thereof which is pivoted to the connecting plate 14 respectively and a stud 43 (shown in FIGS. 3, 4) which is disposed in an inner surface of each handle 40 for connecting to the other end of the spring 25.

A transmission means 30 comprises a pair of long links 31 and a pair of short links 32, each of the links having first and second ends, the pair of long links 31 being pivoted crosswise whose first ends are pivoted to correspondent second ends of the pair of short links 32, and the second ends of the short links 32 are pivoted to a lower end of the extending part 22 of the blade means 20, further, each of the second ends of the long links 31 is pivoted to a pin 44 disposed in each of the handles 40 respectively.

Figure 3:
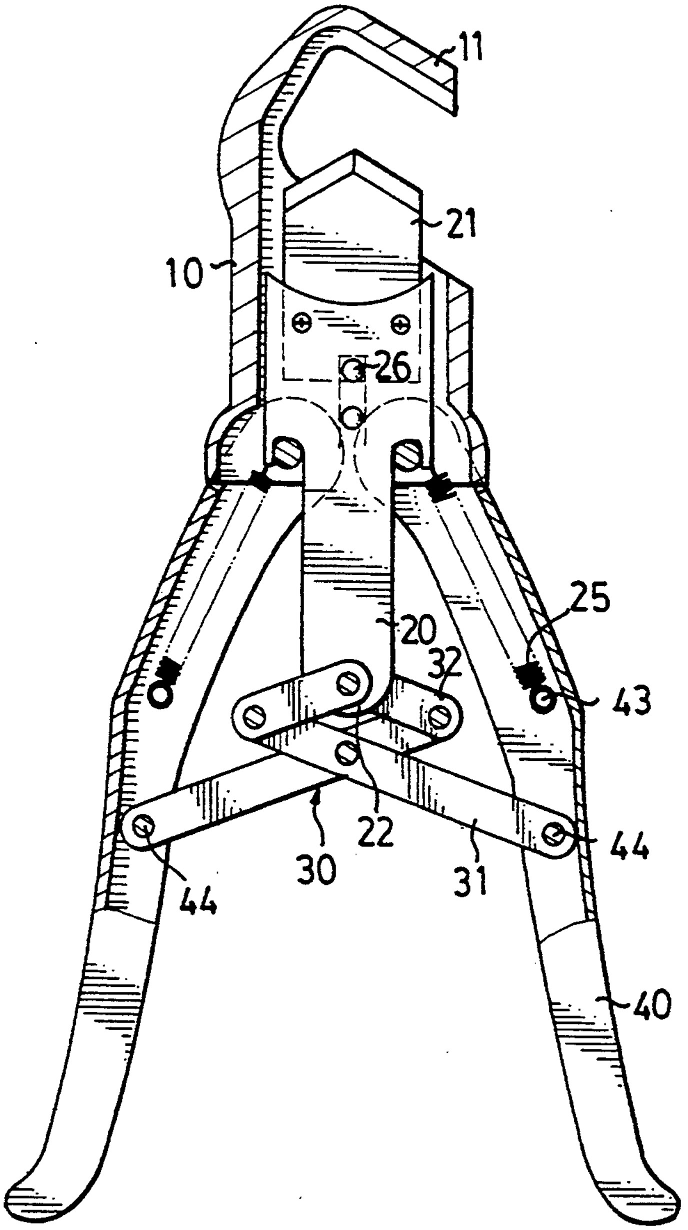
FIG. 3 is a side elevational view, partly in section, of the pipe cutter showing two handles opened wide and a blade means being disposed in a head portion in accordance with the present invention.
Figure 4:
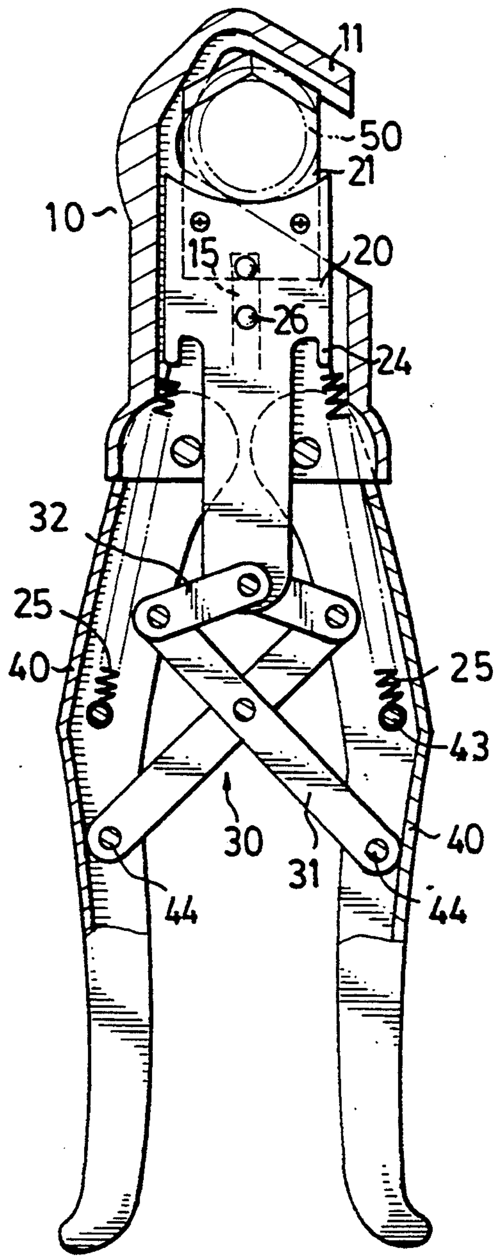
FIG. 4 is a view similar to FIG. 3, wherein the handles are pulled together and the blade means is extended across a mouth defined by the head portion and a jaw element to cut a pipe.

Referring now to FIG. 3, when the handles 40 are opened wide, i.e. no force exerted on them, the springs 25 are unstretched and the blade means 21 is disposed in the passage way 12. Referring now to FIG. 4, when cutting a pipe 50, a user disposes the pipe 50 in the mouth 17 and exerts a force on the handles 40 to push the handles 40 together, the second ends of the pair of long links 31 are then moved close to each other due to the pivoting engagement with the handles 40, and the first ends of the long links 31 activate the pair of pivoted short links 32 to produce an upward force to the blade means 20, the blade means 20 is then pushed upwardly and the blade 21 moves transversely across the mouth 17 to cut the pipe 50 disposed therein. When the handles 40 are released, the handles 40 will return to its preliminary position resulting from the retraction of the spring 25, and the blade means 20 will also return to their preliminary position through the passage way 12, in turn, by the action of the transmission means 30.

Although the invention has been explained in relation to its preferred embodiment, it is to be understood that many other possible modifications and variations can be made without departing from the spirit and scope of the invention as hereinafter claim.

I claim:

1. A pipe cutter comprising:

a hollow head portion having first and second ends, a passage way being formed along a longitudinal axis thereof;

a jaw element formed on said first end of said head portion thereby defining a mouth for receiving a pipe to be cut;

a blade means having a blade received therein, said blade slidably engaged in said passage way of said head portion;

two handles, each having two ends, one end of each thereof pivoted to said head portion; and a transmission means having a pair of long links and a pair of short links, each of said links having first and second ends, said pair of long links being pivoted crosswise whose first ends being pivoted with correspondent second ends of said pair of short links, said first ends of said short links being pivoted to said second end of said blade means, and each of the second ends of said long links being pivoted to the handles respectively such that said transmission means converts pivotal movements of said handles into linear movement of said blade means.

2. The pipe cutter as claimed in claim 1 wherein two springs are connected between said blade means and said handles.

3. The pipe cutter as claimed in claim 1 wherein said head portion has a slot formed in an inner surface thereof and a roller rotatably engaged in said outer surface of said blade means so as to rotatably move in said slot.

* * * * *